United States Patent
Iyengar et al.

(10) Patent No.: US 9,826,364 B2
(45) Date of Patent: Nov. 21, 2017

(54) SYSTEMS AND METHODS FOR LOCATION-BASED TUNING

(71) Applicant: QUALCOMM Incorporated, San Diego, CA (US)

(72) Inventors: Pranav Iyengar, San Diego, CA (US); Ashish Banthia, San Diego, CA (US); Mahbod Mofidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/857,465

(22) Filed: Sep. 17, 2015

(65) Prior Publication Data
US 2016/0295370 A1 Oct. 6, 2016

Related U.S. Application Data

(60) Provisional application No. 62/142,925, filed on Apr. 3, 2015.

(51) Int. Cl.
| | | |
|---|---|---|
| *H04W 24/00* | (2009.01) | |
| *H04W 4/02* | (2009.01) | |
| *H04L 5/00* | (2006.01) | |
| *H04W 4/00* | (2009.01) | |
| *H04W 72/04* | (2009.01) | |
| *H04W 64/00* | (2009.01) | |

(52) U.S. Cl.
CPC ........... *H04W 4/025* (2013.01); *H04L 5/0055* (2013.01); *H04W 4/008* (2013.01); *H04W 64/006* (2013.01); *H04W 72/048* (2013.01)

(58) Field of Classification Search
CPC ... H04W 4/025; H04W 4/008; H04W 72/048; H04L 5/0055
USPC .............. 455/456.1, 41.2, 406, 552.1, 456.5
See application file for complete search history.

(56) References Cited

U.S. PATENT DOCUMENTS

| | | | | |
|---|---|---|---|---|
| 6,249,252 | B1 * | 6/2001 | Dupray | G01S 1/028 |
| | | | | 342/357.29 |
| 8,140,053 | B2 * | 3/2012 | Jatschka | G06K 19/0723 |
| | | | | 455/410 |
| 8,238,874 | B2 * | 8/2012 | Aebi | G01S 5/0054 |
| | | | | 379/114.28 |
| 8,249,500 | B2 * | 8/2012 | Wilson | G06K 19/0723 |
| | | | | 235/451 |
| 8,750,793 | B2 * | 6/2014 | Tysowski | G06Q 10/10 |
| | | | | 340/10.1 |

(Continued)

OTHER PUBLICATIONS

International Search Report and Written Opinion—PCT/US2016/018654—ISA/EPO—dated May 27, 2016.

*Primary Examiner* — Marceau Milord
(74) *Attorney, Agent, or Firm* — Austin Rapp & Hardman, P.C.

(57) ABSTRACT

A method for wireless communication by a wireless communication device is described. The method includes receiving geographic location information. The method also includes querying a geographic location tuning database for tuning parameter values corresponding with the geographic location information. The method further includes determining one or more tuning parameters to change based on the tuning parameter values. The method additionally includes adjusting an antenna for inductively coupled communication with a reader device according to the determined tuning parameters.

29 Claims, 11 Drawing Sheets

(56) References Cited

U.S. PATENT DOCUMENTS

| | | | | |
|---|---|---|---|---|
| 8,787,944 B2* | 7/2014 | Smith | | H04W 64/00 455/404.2 |
| 8,918,117 B2* | 12/2014 | Rochberger | | G01S 5/0236 455/456.1 |
| 8,923,761 B2* | 12/2014 | Hillan | | H04M 1/7253 235/451 |
| 8,942,736 B2* | 1/2015 | Gao | | H04W 64/00 455/437 |
| 8,963,785 B2* | 2/2015 | Dong | | H01Q 13/106 343/702 |
| 9,173,065 B2* | 10/2015 | Smith | | H04W 64/00 |
| 9,232,354 B2* | 1/2016 | Smith | | H04W 64/00 |
| 9,286,910 B1* | 3/2016 | Li | | G10L 25/48 |
| 9,583,838 B2* | 2/2017 | Zhu | | H01Q 13/10 |
| 9,647,884 B2* | 5/2017 | Hillan | | H04L 41/0806 |
| 2005/0077356 A1* | 4/2005 | Takayama | | G06K 7/10237 235/451 |
| 2007/0008140 A1* | 1/2007 | Saarisalo | | G06K 7/0008 340/572.7 |
| 2007/0197229 A1* | 8/2007 | Kalliola | | G01S 3/46 455/456.1 |
| 2008/0045234 A1 | 2/2008 | Reed | | |
| 2009/0005061 A1* | 1/2009 | Ward | | G01S 5/021 455/456.1 |
| 2009/0054067 A1* | 2/2009 | Gauthier | | G06F 3/011 455/440 |
| 2009/0054077 A1* | 2/2009 | Gauthier | | G06F 3/014 455/456.1 |
| 2009/0065571 A1 | 3/2009 | Jain | | |
| 2009/0096413 A1* | 4/2009 | Partovi | | H01F 5/003 320/108 |
| 2009/0247077 A1* | 10/2009 | Sklovsky | | G06F 9/445 455/41.1 |
| 2010/0264211 A1* | 10/2010 | Jain | | G06F 1/1698 235/380 |
| 2011/0022755 A1* | 1/2011 | Sueyoshi | | H04B 5/0031 710/109 |
| 2011/0226853 A1* | 9/2011 | Soh | | G06K 7/10237 235/380 |
| 2012/0045989 A1* | 2/2012 | Suumaki | | H04W 8/005 455/41.1 |
| 2012/0062366 A1* | 3/2012 | Pappu | | G06K 7/10009 340/10.1 |
| 2012/0075072 A1* | 3/2012 | Pappu | | H04B 5/0037 340/10.1 |
| 2012/0158235 A1* | 6/2012 | Jaynes | | B25J 9/1656 701/25 |
| 2012/0309302 A1* | 12/2012 | Buhot | | G06K 7/10237 455/41.1 |
| 2013/0095846 A1 | 4/2013 | Brisebois et al. | | |
| 2013/0109412 A1* | 5/2013 | Nguyen | | G06Q 30/0207 455/456.3 |
| 2013/0281013 A1* | 10/2013 | Hillan | | H04B 5/02 455/41.1 |
| 2014/0066098 A1* | 3/2014 | Stern | | H04W 4/043 455/456.3 |
| 2014/0074874 A1 | 3/2014 | Fraccaroli | | |
| 2014/0127993 A1 | 5/2014 | Frankland | | |
| 2014/0162683 A1* | 6/2014 | Rochberger | | G01S 5/0236 455/456.1 |
| 2014/0247148 A1* | 9/2014 | Proud | | H02J 7/025 340/870.02 |
| 2014/0266627 A1 | 9/2014 | Padilla et al. | | |
| 2014/0370804 A1 | 12/2014 | Dorning | | |
| 2015/0129666 A1* | 5/2015 | Butler | | H04L 67/1097 235/492 |
| 2016/0084936 A1* | 3/2016 | Smith | | G01S 5/0263 455/456.1 |

* cited by examiner

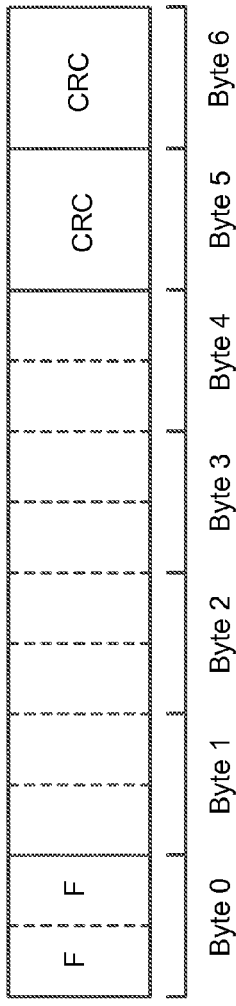
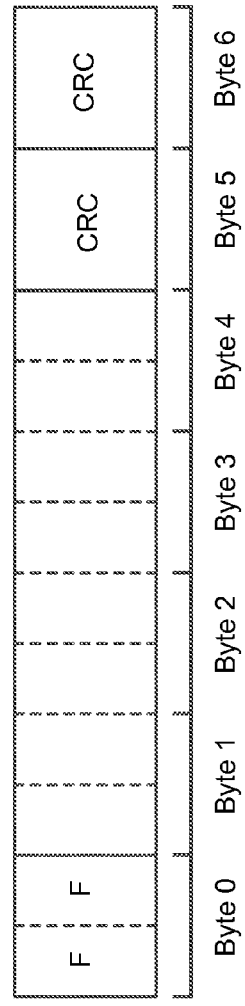
FIG. 5

SYSTEMS AND METHODS FOR LOCATION-BASED TUNING

RELATED APPLICATIONS

This application is related to and claims priority from U.S. Provisional Patent Application Ser. No. 62/142,925, filed Apr. 3, 2015, for "SYSTEMS AND METHODS FOR LOCATION-BASED TUNING."

TECHNICAL FIELD

The present disclosure relates generally to wireless communications. More specifically, the present disclosure relates to geographic location-based tuning of a near-field communication (NFC) antenna.

BACKGROUND

The wireless communication environment in a home or an office generally includes a number of independently developed radio access technologies and standards. These technologies were initially designed for target applications and they perform relatively well for these applications. In a typical home or office environment, an access to content (e.g., web, video, etc.) is provided to a broadband modem through the home-owner's IP backhaul connection. For instance, mobile services are provided through the cellular network, through either a macro cell or a femto cell located within the home or office. Wireless local area network (WLAN) access points (APs) provide data connectivity between computers, cell phones, laptops, printers, and other wireless stations using 802.11-based Wi-Fi technology.

Another communication medium currently being implemented in electronic equipment is near-field communication (NFC). The use of NFC interfaces in electronic equipment provides portable devices with functions similar to those of non-contact integrated circuit cards (e.g., radio frequency identification (RFID) cards). In addition, electronic equipment provided with NFC interfaces is typically capable of operating as radio frequency (RF) readers and/or writers to communicate with other NFC devices. A basic aspect of NFC is the use of electromagnetic waves in an RF range and the transmission of information content is realized over a short distance only, for instance in a range of about several centimeters.

A wireless communication device may communicate with a remote device using NFC technology. Tuning parameters used for NFC may vary according to geographic location. Benefits may be realized by performing geographic location-based tuning of an NFC antenna.

SUMMARY

A method for wireless communication by a wireless communication device is described. The method includes receiving geographic location information. The method also includes querying a geographic location tuning database for tuning parameter values corresponding with the geographic location information. The method further includes determining one or more tuning parameters to change based on the tuning parameter values. The method additionally includes adjusting an antenna for inductively coupled communication with a reader device according to the determined tuning parameters.

The geographic location information may be received in at least one of a Global Positioning System (GPS) signal, a wireless wide area network (WWAN) signal, or a wireless local area network (WLAN) signal.

The geographic location information may be received in a non-standardized message sent by the reader device. The non-standardized message may include geographic location coordinates of the reader device. The non-standardized message may include a unique signature associated with the reader device from which the geographic location information of the reader device is determined.

The non-standardized message may be received in response to sending a poll response to the reader device. The non-standardized message may be sent using a near-field communication (NFC) technology identified by the poll response. The non-standardized message may include a packet that includes a command code byte that identifies the packet as a non-standardized packet from the reader device, one or more bytes that include the geographic location information, and one or more bytes with cyclic redundancy check information for the identified NFC technology.

The method may also include sending a non-standardized response to the reader device indicating support for antenna tuning based on the geographic location information. The non-standardized response may include a packet that includes a command code byte that identifies the packet as a non-standardized packet from the wireless communication device, one or more bytes that include an acknowledgment (ACK) response, and one or more bytes with cyclic redundancy check information for the identified NFC technology.

The geographic location information may be received via a combination of a GPS signal and a non-standardized message. The GPS signal may be used by default to obtain the geographic location information. The non-standardized message may be used to obtain the geographic location information if the GPS signal is not available.

A wireless communication device is also described. The wireless communication device includes a processor, a memory in communication with the processor, and instructions stored in the memory. The instructions are executable by the processor to receive geographic location information. The instructions are also executable to query a geographic location tuning database for tuning parameter values corresponding with the geographic location information. The instructions are further executable to determine one or more tuning parameters to change based on the tuning parameter values. The instructions are additionally executable to adjust an antenna for inductively coupled communication with a reader device according to the determined tuning parameters.

A method for wireless communication by a reader device is also described. The method includes sending a non-standardized message that includes geographic location information to a wireless communication device. The method also includes determining whether the wireless communication device supports tuning an antenna for inductively coupled communication based on the non-standardized message.

The non-standardized message may include geographic location coordinates of the reader device. The non-standardized message may include a unique signature associated with the reader device from which the geographic location information of the reader device is determined.

The non-standardized message may be sent in response to receiving a poll response from the wireless communication device. The non-standardized message may be sent using an NFC technology identified by the poll response.

The method may also include turning off a magnetic field of the reader device for a period of time sufficient to allow the wireless communication device to tune its antenna according to the geographic location information included in the non-standardized message. The method may further include turning on the magnetic field after the period of time to perform an NFC transaction with the wireless communication device.

A reader device is also described. The reader device includes a processor, a memory in communication with the processor, and instructions stored in the memory. The instructions are executable by the processor to send a non-standardized message that includes geographic location information to a wireless communication device. The instructions are executable to determine whether the wireless communication device supports tuning an antenna for inductively coupled communication based on the non-standardized message.

BRIEF DESCRIPTION OF THE DRAWINGS

FIG. 5 is a block diagram illustrating examples of a non-standardized message and a non-standardized response for geographic location-based tuning;

DETAILED DESCRIPTION

Figure 1:
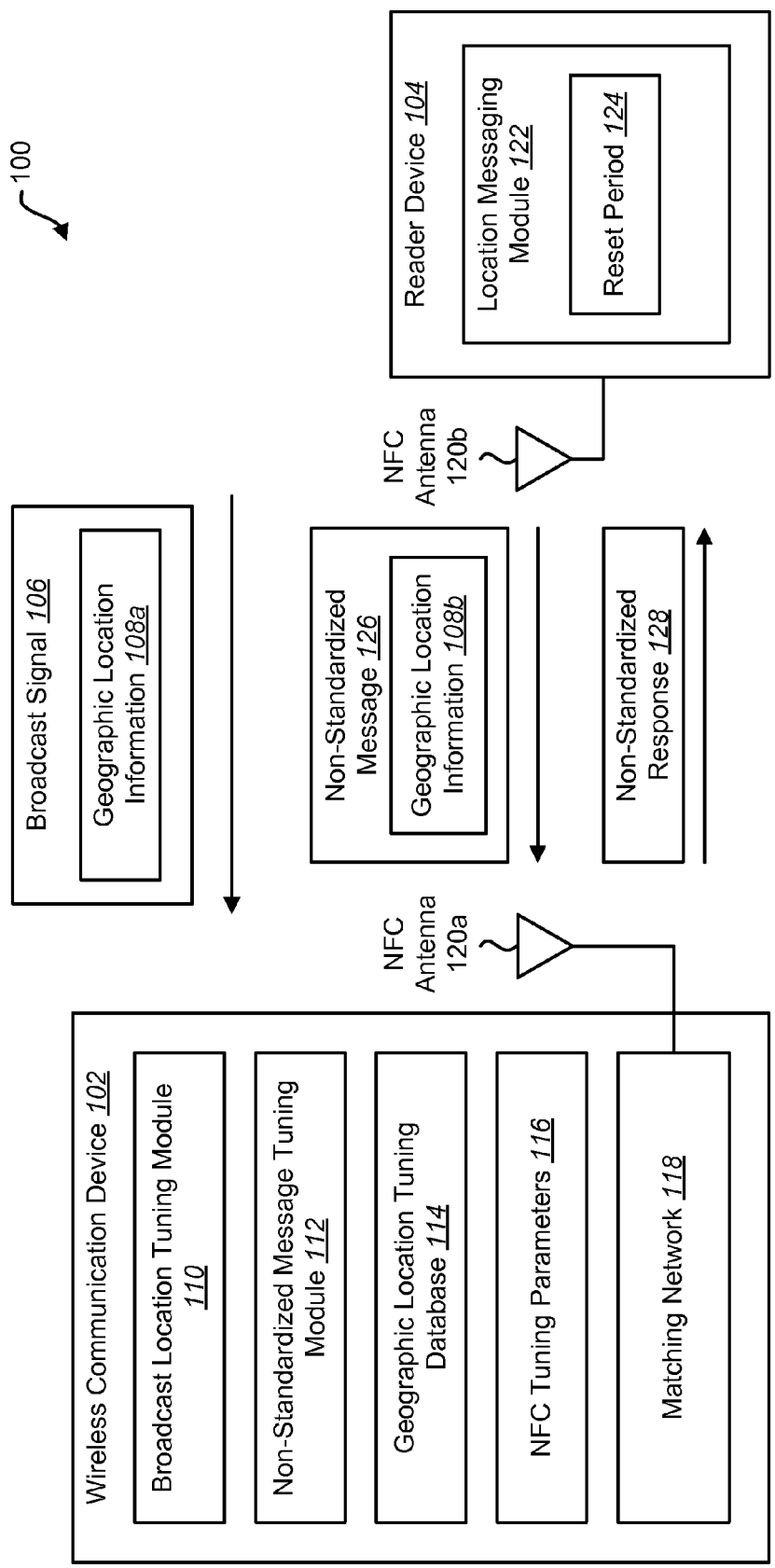
FIG. 1 is a block diagram illustrating one configuration of a wireless communication system for geographic location-based tuning of a near-field communication (NFC) antenna.

A wireless communication device may perform near-field communication (NFC) operations with a reader device. The wireless communication device may use certain NFC tuning parameters to communicate with the reader device. However, the tuning parameters used by reader devices may vary from one geographic location to another. If the NFC antenna of a wireless communication device is tuned for one geographic location, then NFC operations in another geographic location may not perform optimally.

To address these problems, a wireless communication device may perform geographic location-based tuning. The wireless communication device may receive geographic location information. In one implementation, the geographic location information may be received in a broadcast signal (e.g., Global Positioning System (GPS) signal, a wireless wide area network (WWAN) signal, or a wireless local area network (WLAN) signal). In another implementation, the geographic location information is received in a non-standardized message sent by the reader device. The wireless communication device may then tune its NFC antenna based on the received geographic location information.

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from those shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication system 100 for geographic location-based tuning of a near-field communication (NFC) antenna 120. The wireless communication system 100 may include a wireless communication device 102 that is in communication with a reader device 104. In one configuration, the wireless communication device 102 and the reader device 104 may communicate using inductively coupled communication.

In one implementation of inductively coupled communication, the wireless communication device 102 and the reader device 104 may use near-field communication (NFC). In the context of NFC, there are two devices communicating: an initiator and a target. For example, the wireless communication device 102 may be a target NFC device and the reader device 104 may be an initiator NFC device.

The antenna 120 of an initiator NFC device produces a radiated field (also referred to as a magnetic field or an electromagnetic field) that is received by the antenna of the target NFC device. The initiator NFC device may also be referred to as a poller, polling device, reader or initiator. The target NFC device may also be referred to as a listener, listening device, tag or target.

The wireless communication device 102 and the reader device 104 may use one or more NFC signaling technologies to communicate with each other. The NFC signaling technologies may include NFC type-A, NFC type-B and NFC type-F. The NFC signaling technologies differ in the modulation schemes employed.

NFC has four different tag types that support a subset of the NFC signaling technologies. Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In a configuration, the wireless communication device 102 and the reader device 104 may be operable to communicate using NFC through various interfaces, such as a frame RF interface, ISO-data exchange protocol (DEP) RF interface and NFC-DEP RF interface. In another configuration, the wireless communication device 102 and the reader device 104 may establish an NFC-DEP RF protocol-based communication link with link layer connections defined through a logical link control protocol (LLCP). In still another configuration, the wireless communication device 102 and the reader device 104 may be operable to be connected to an access network and/or core network (e.g., a CDMA network, a GPRS network, a UMTS network, and other types of wireline and wireless communication networks).

The reader device 104 may poll for nearby NFC devices. The wireless communication device 102 may begin to listen when it comes within a few centimeters of the reader device 104. In an example, a user may place a wireless communication device 102 in the vicinity of the reader device 104 to initiate a payment transaction. The reader device 104 will then communicate with the wireless communication device 102 in order to determine which signaling technologies can be used.

The reader device 104 may generate an RF field to communicate with the wireless communication device 102. The reader device 104 may modulate the RF field to send a signal (e.g., data) to the wireless communication device 102. Once the wireless communication device 102 receives that signal, the reader device 104 may transmit a continuous wave to maintain the RF field. In NFC operation, the wireless communication device 102 may receive the RF field. The wireless communication device 102 may respond by performing modulation on top of the continuous wave. The reader device 104 may receive the modulated signal and may try to decode it.

The wireless communication device 102 may include an NFC antenna 120a and matching network 118 for NFC operations. In an implementation, the NFC antenna 120a may be a coil antenna or a loop antenna. The wireless communication device 102 may communicate with the reader device 104 by sending or receiving NFC signals. The reader device 104 may include an NFC antenna 120b.

NFC antenna tuning refers to the optimization of at least one or more NFC tuning parameters 116. The NFC tuning parameters 116 may include a target receive (RX) frequency, a target transmit (TX) frequency, an initiator RX frequency, an initiator TX frequency and load modulation ON/OFF impedance. In one example, the initiator TX frequency may operate at a certain carrier frequency. In the case of NFC, the carrier frequency may be 13.56 megahertz (MHz). The wireless communication device 102 may tune the NFC antenna 120a by adjusting antenna resonance, which changes one or more NFC tuning parameters 116.

In an implementation, antenna tuning can be performed by adjusting one or more components of the matching network 118. For example, on-board matching components (e.g., capacitors, inductors and resistors) may be adjusted according to one or more of the NFC tuning parameters 116.

In addition, the matching can be further fine-tuned using a capacitor bank inside the NFC chip. This capacitor bank can be software controlled.

In one approach, NFC antenna tuning is performed during the development stage of the wireless communication device 102. For example, the matching network 118 and NFC antenna 120a may be tuned during manufacturing of the wireless communication device 102. With this approach, once the wireless communication device 102 is shipped into the market, NFC antenna tuning may be difficult, and may require a change in the hardware, software or both.

Being restricted to a single (e.g., fixed) tuning configuration has several limitations. A single tuning configuration may not be sufficient to work with reader devices 104 worldwide. This may result in different stock keeping units (SKUs) for different regions. For example, there may be one antenna tuning configuration for Europe and another antenna tuning configuration for Asia (e.g., China).

Additionally, to be compatible with different readers devices 104 around the world that operate with different frequencies and varying power levels, the size of the NFC antenna 120a (and ferrite) of the wireless communication device 102 tends to increase. Furthermore, there are no means for dynamically tuning an NFC antenna 120a based on the reader device 104 profile or type.

To address the problems associated with a fixed tuning configuration, the wireless communication device 102 may perform geographic location-based NFC tuning. According to the systems and methods described herein, the NFC antenna 120a can be dynamically tuned based on the geographic location of a reader device 104, the location of the wireless communication device 102 or both.

In a first approach, an NFC antenna 120a may be tuned based on receiving geographic location information 108a in a broadcast signal 106. In this approach, the wireless communication device 102 may receive a broadcast signal 106. The broadcast signal 106 may be one or more of a Global Positioning System (GPS) signal, a wireless wide area network (WWAN) signal, or a wireless local area network (WLAN) signal that includes geographic location information 108a.

In an example, a GPS signal provides coordinates (e.g., latitude and longitude) for a particular geographic location. The wireless communication device 102 may receive the GPS signal and determine its geographic location. Similarly, a WWAN signal or a WLAN signal may provide geographic location information 108a in the form of geographic coordinates.

Based on the geographic location information 108a, the NFC tuning parameters 116 can be changed accordingly. In one implementation, the wireless communication device 102 may include a geographic location tuning database 114 that maps geographic locations to associated NFC tuning parameters 116. In an implementation, the geographic location tuning database 114 may organize geographic locations into regions. The regions may be associated with particular values for the NFC tuning parameters 116. Therefore, the geographic location tuning database 114 may return tuning parameter values for the region identified by the geographic location information 108.

The geographic location tuning database 114 may provide values for the NFC tuning parameters 116 that may be applied in a particular region. The region in which the wireless communication device 102 is currently located may be determined from the geographic location information 108. If the geographic location information 108 indicates that the wireless communication device 102 is within a particular region, the geographic location tuning database 114 may provide the values for NFC tuning parameters 116 to apply for that region. For example, the geographic location tuning database 114 may provide values for one or more of a target receive (RX) frequency, a target transmit (TX) frequency, an initiator RX frequency, an initiator TX frequency and/or load modulation ON/OFF impedance used in the region indicated by the geographic location information 108.

The NFC tuning parameters 116 for each region can be hard coded in the software (e.g., geographic location tuning database 114) of the wireless communication device 102 during development. Additionally, the geographic location tuning database 114 may be updated via a software update. Therefore, the geographic location tuning database 114 may be updated to provide optimized tuning for reader devices 104 that are most likely to be encountered in a particular region.

The wireless communication device 102 may include a broadcast location tuning module 110 that determines NFC tuning parameters 116 based on the geographic location information 108a received in the broadcast signal 106. For example, the broadcast location tuning module 110 may determine one or more NFC tuning parameters 116 to change by querying the geographic location tuning database 114 for tuning parameter values corresponding with the geographic location information 108a included in the broadcast signal 106.

In an example, if a person travels from the United States of America to China, once the user arrives in China, the geographic location on the wireless communication device 102 is updated through GPS. The revised geographic location is fed to the NFC engine (e.g., broadcast location tuning module 110) which then adjusts the NFC tuning parameters 116. Again, when the user travels to the United Kingdom, the geographic location on the wireless communication device 102 gets updated through GPS and the NFC tuning parameters 116 get updated accordingly.

The wireless communication device 102 may tune the NFC antenna 120a by adjusting the NFC tuning parameters 116. This may be accomplished by changing the resonance of the matching network 118 or the NFC chip or both. For example, the wireless communication device 102 may adjust one or more capacitors in a capacitor bank in the matching network 118 to change the resonance of the NFC antenna 120a.

In another approach, the antenna tuning may be based on geographic location information 108 provided by a non-standardized message 126 sent from the reader device 104. In an implementation, the non-standardized message 126 may be a proprietary message. As used herein, the term "proprietary" includes unique, exclusive, specialized, non-standard, ad hoc and/or pre-defined applications. A proprietary message may be a message that has a design or format that is unique to the manufacturer or operator of the reader device 104 and/or wireless communication device 102.

A non-standardized message 126 may have a format and/or information that do not follow radio access standards (e.g., NFC standards). The non-standardized message 126 may be a specialized message that is used to convey geographic location information 108. For example, the non-standardized message 126 may have a format that is unique to the manufacturer or operator of the reader device 104 and/or wireless communication device 102.

The reader device 104 may include a location messaging module 122. When a transaction is performed between the reader device 104 and the wireless communication device 102 configured with NFC, non-standardized messages 126 may be used by the reader device 104 to send the geographic location information 108. The location messaging module 122 may generate a non-standardized message 126 with geographic location information 108b associated with the reader device 104.

In one implementation, the non-standardized message 126 may include location coordinates of the reader device 104. For example, a person could travel from the United States to China. Upon arriving in China, the user may attempt to communicate with a reader device 104 (e.g., POS terminal). The reader device 104 may transfer the location coordinates to the wireless communication device 102 using the non-standardized message 126. Based on the location, the wireless communication device 102 can change its NFC tuning parameters 116.

In another implementation, the non-standardized message 126 may include a unique signature associated with the reader device 104. The geographic location information 108 of the reader device 104 may be determined based on the unique signature. For example, each reader type can have a unique signature sent in the non-standardized message 126. The geographic location tuning database 114 (or another database) may map the unique signature of the reader device 104 to a geographic location.

The wireless communication device 102 may include a non-standardized message tuning module 112. The geographic location information 108b included in the non-standardized message 126 can be used by the non-standardized message tuning module 112 to change the NFC tuning parameters 116. Based on the type of reader encountered, the NFC tuning parameters 116 can change dynamically.

The reader device 104 may perform Type-A or B or F transactions with the NFC-enabled wireless communication device 102. Based on the technology type supported by the reader device 104, the reader device 104 may send one or more poll commands. For NFC type-A, the reader device 104 may send a SENS_REQ poll command. For NFC type-B, the reader device 104 may send a SENSB_REQ poll command. For NFC type-F, the reader device 104 may send a SENSF_REQ poll command.

If the wireless communication device 102 sends a valid poll response, the reader device 104 may send a non-standardized message 126 using the same NFC technology identified by the poll response. The non-standardized message 126 may be a non-standardized packet that includes geographic location information 108b for the reader device 104. The non-standardized message 126 is described in more detail in connection with FIG. 5.

If the wireless communication device 102 supports the non-standardized message exchange, then the wireless communication device 102 may send a valid non-standardized response 128 to the reader device 104 indicating support for tuning based on the non-standardized message 126. As used herein, the non-standardized response may be a non-standardized response. A non-standardized response may have a format and/or information that do not follow radio access standards (e.g., NFC standards).

The wireless communication device 102 may then tune its NFC antenna 120a based on the geographic location information 108b exchanged in the non-standardized message 126. This may be accomplished as described above. For example, the wireless communication device 102 may determine one or more NFC tuning parameters 116 to change by querying the geographic location tuning database 114 for tuning parameter values corresponding with the geographic location information 108b.

The reader device 104 may turn off its magnetic field and turn it back on to reset the wireless communication device 102 for communication using the adjusted tuning. The reader device 104 may turn off the magnetic field for a reset period 124. The reset period 124 may be an amount of time sufficient to allow the wireless communication device 102 to tune its NFC antenna 120a according to the geographic location information 108b included in the non-standardized message 126.

In an example, the reset period 124 may be 10 milliseconds (ms). In this case, the reader device 104 may allow a window of 10 ms for the wireless communication device 102 to respond to the non-standardized message 126. It should be noted that devices that do not support this type of non-standardized data exchange will be mute and refrain from sending a response to the non-standardized message 126. If a device does not support the non-standardized data exchange, the reader device 104 will timeout after the reset period 124.

After the reset period 124, the reader device 104 may turn on the magnetic field to perform an NFC transaction with the wireless communication device 102. In one implementation, the reader device 104 may determine whether the wireless communication device 102 supports tuning an NFC antenna 120a based on the non-standardized message 126. If the wireless communication device 102 supports tuning based on the non-standardized message 126, then the wireless communication device 102 may send a valid non-standardized response 128. However, for devices that do not support the non-standardized data exchange, the reader device 104 may timeout. The reader device 104 may perform an NFC transaction after the timeout or upon receiving a valid non-standardized response 128, whichever occurs first.

By providing geographic location information 108b in the non-standardized message 126, the reader device 104 may minimize the amount of information that is sent to the wireless communication device 102 for geographic location-based tuning. The reader device 104 may send the geographic location information 108b, and the wireless communication device 102 may determine the NFC tuning parameters 116 to apply. Therefore, the reader device 104 may send a small payload in the non-standardized message 126 that includes the geographic location information 108b instead of the detailed NFC tuning parameters 116 themselves. This may simplify the non-standardized message exchange, which may result in a more efficient and faster NFC link establishment between the reader device 104 and the wireless communication device 102.

Tuning based on broadcast geographic location information 108a provided by GPS may generally be a more reliable way of tuning. This is because if the tuning is off beyond a certain limit, then the exchange of non-standardized packets may not be reliable, thus making it difficult to share the geographic location information 108b in a non-standardized message 126. However, both approaches may be deployed because tuning based on geographic location information 108b provided by non-standardized messages 126 may be beneficial especially when the wireless communication device 102 is in a low battery mode and GPS capability is not available on the wireless communication device 102.

In one implementation, the geographic location information 108 may be received via a combination of GPS signals and a non-standardized message 126. For example, in full battery mode, NFC antenna tuning may be based on the broadcast geographic location information 108a provided by GPS by default. If the GPS is OFF, or GPS capability is not available, then the wireless communication device 102 may obtain geographic location information 108b via a non-standardized message exchange when it comes into the magnetic field of the reader device 104. If the tuning has already been done via GPS, then the wireless communication device 102 may decide to acknowledge the non-standardized message 126 but may ignore the geographic location information 108b sent by the reader device 104.

The described systems and methods provide multiple benefits. A wireless communication device 102 may dynamically tune its NFC antenna 120a based on the geographic location in which the wireless communication device 102 is operating. This may improve the success of NFC transactions between a wireless communication device 102 and a reader device 104, which may result in a better user experience. Additionally, a reader device 104 may provide geographic location information 108b to facilitate geographic location-based tuning. Furthermore, the systems and methods described herein are backward compatible and will work with NFC-enabled wireless communication devices 102 that support non-standardized data exchange and wireless communication devices 102 that do not support the non-standardized data exchange.

Figure 2:
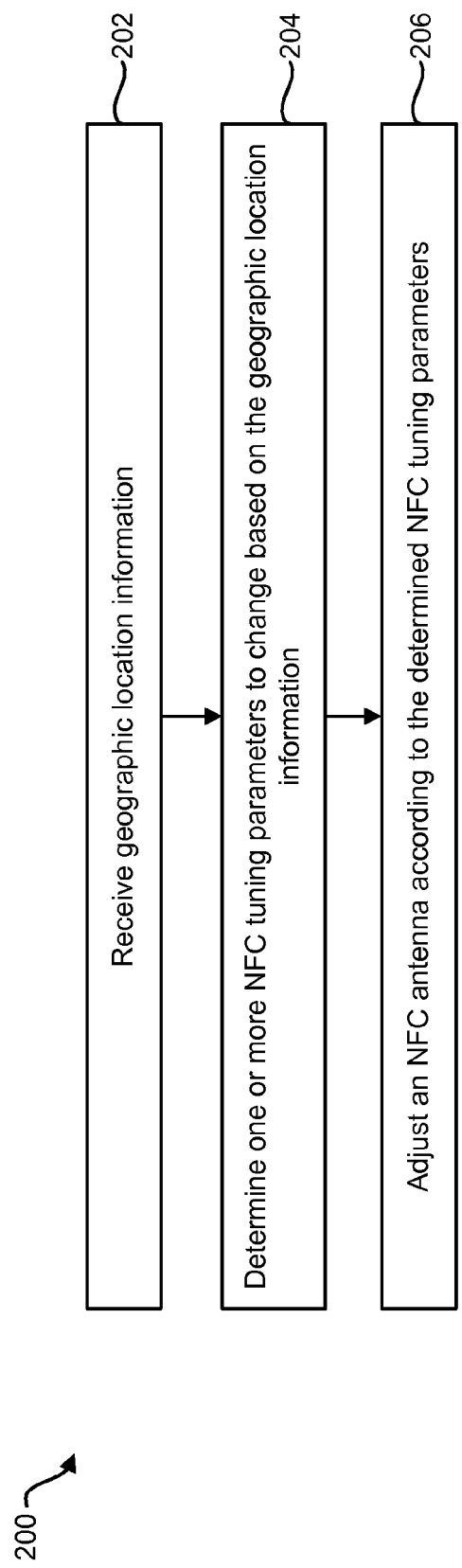
FIG. 2 is a flow diagram illustrating a method for geographic location-based tuning of an NFC antenna.

FIG. 2 is a flow diagram illustrating a method 200 for geographic location-based tuning of an NFC antenna 120a. The method 200 may be performed by a wireless communication device 102. The wireless communication device 102 may be configured with NFC circuitry. The NFC circuitry may include an NFC controller and NFC antenna circuitry (e.g., an NFC antenna 120a and matching network 118).

The wireless communication device 102 may receive 202 geographic location information 108. In one approach, the wireless communication device 102 may receive 202 the geographic location information 108 in a broadcast signal 106. In an implementation, the broadcast signal 106 may be at least one of a GPS signal, WWAN signal, or a WLAN signal.

In another approach, the wireless communication device 102 may receive 202 the geographic location information 108 in a non-standardized message 126 sent by a reader device 104. For example, when the wireless communication device 102 enters the magnetic field of the reader device 104, the reader device 104 may initiate an NFC polling procedure. In response to receiving the poll command from the reader device 104, the wireless communication device 102 may send a poll response. Upon receiving the poll response, the reader device 104 may send a non-standardized message 126 that includes the geographic location information 108.

The non-standardized message 126 may include geographic location coordinates of the reader device 104 or a unique signature associated with the reader device 104 from which the geographic location of the reader device 104 may be determined.

The wireless communication device 102 may determine 204 one or more tuning parameters 116 to change based on the geographic location information 108. For example, the wireless communication device 102 may query a geographic location tuning database 114 for tuning parameter values corresponding with the geographic location information 108. The geographic location tuning database 114 may provide NFC tuning parameters 116 associated with a particular geographic location. The NFC tuning parameters 116 may include a target receive (RX) frequency, a target transmit (TX) frequency, an initiator RX frequency, an initiator TX frequency and load modulation ON/OFF impedance.

The wireless communication device 102 may adjust 206 the NFC antenna 120a according to the determined tuning parameters 116. NFC antenna 120a tuning can be performed by changing the resonance of the matching network 118. This may be accomplished by adjusting one or more components of the matching network 118. In an implementation, the wireless communication device 102 may adjust one or more capacitors in a capacitor bank in the matching network 118 to achieve the values indicated by the determined tuning parameters 116.

Figure 3:
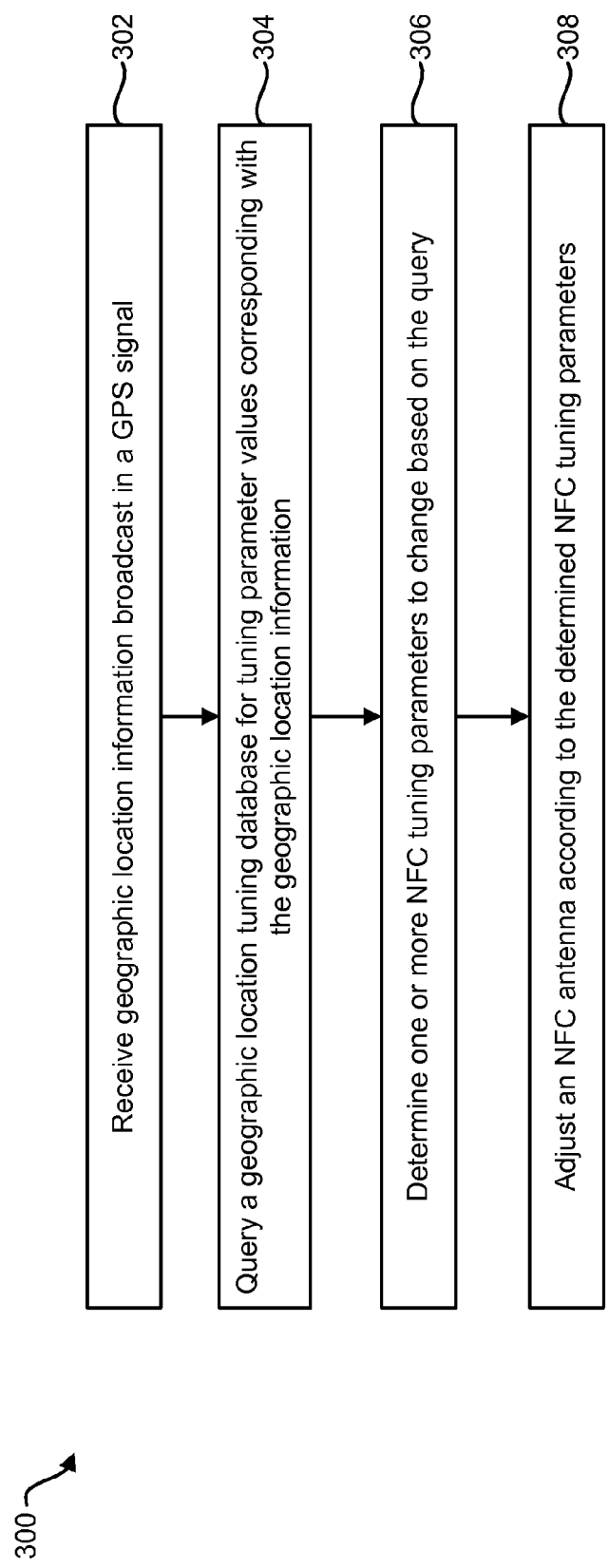
FIG. 3 is a flow diagram illustrating a method for tuning of an NFC antenna based on geographic location information included in a Global Positioning System (GPS) signal.

FIG. 3 is a flow diagram illustrating a method 300 for tuning of an NFC antenna 120a based on geographic location information included in a GPS signal. The method 300 may be performed by a wireless communication device 102. The wireless communication device 102 may be configured with NFC circuitry. The NFC circuitry may include an NFC controller and NFC antenna circuitry (e.g., an NFC antenna 120a and matching network 118).

The wireless communication device 102 may receive 302 geographic location information 108 broadcast in a GPS signal. The geographic location information 108 of the GPS signal may be in the form of coordinates for the current location of the wireless communication device 102.

The wireless communication device 102 may query 304 a geographic location tuning database 114 for tuning parameter values corresponding with the geographic location information 108. The geographic location tuning database 114 may provide values for the NFC tuning parameters 116 that may be applied in a particular region.

The wireless communication device 102 may determine 306 one or more tuning parameters 116 to change based on the geographic location tuning database 114 query. For example, the geographic location tuning database 114 may output one or more NFC tuning parameters 116 that may be changed based on the input geographic location information 108.

The wireless communication device 102 may adjust 308 the NFC antenna 120a according to the determined NFC tuning parameters 116. NFC antenna 120a tuning can be performed by changing the resonance of the matching network 118. This may be accomplished by adjusting one or more components of the matching network 118.

Figure 4:
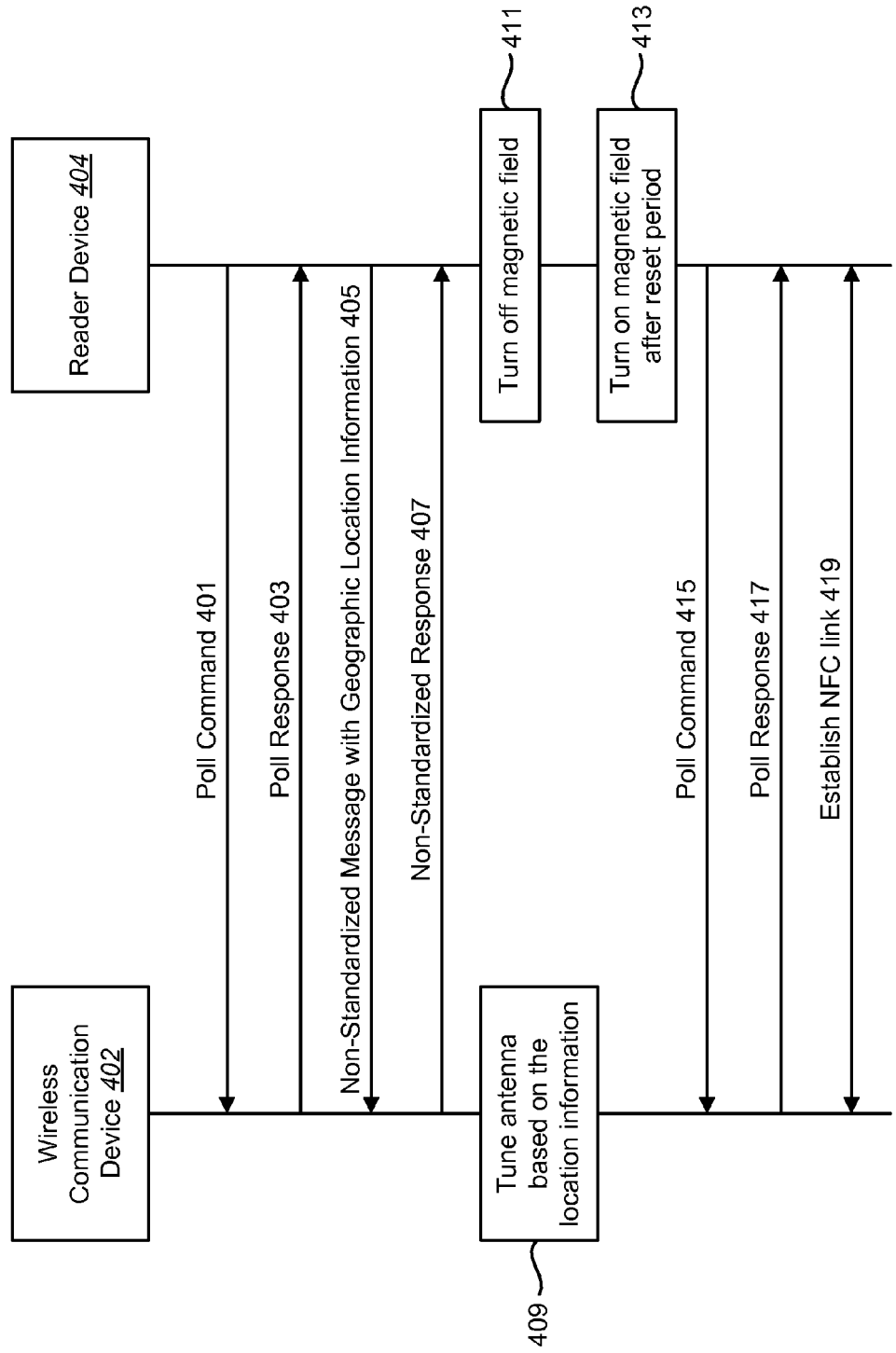
FIG. 4 is a sequence diagram illustrating one example of geographic location-based tuning of an NFC antenna.

FIG. 4 is a sequence diagram illustrating one example of geographic location-based tuning of an NFC antenna 120a. A wireless communication device 402 and a reader device 404 may be configured with NFC circuitry. The NFC circuitry may include an NFC controller and NFC antenna circuitry (e.g., an NFC antenna 120a and matching network 118). In this example, the wireless communication device 102 may tune its NFC antenna 120a based on a non-standardized message 126 received from the reader device 404.

The wireless communication device 402 may enter the magnetic field of the reader device 404. Upon sensing that the wireless communication device 402 has entered its magnetic field, the reader device 404 may send 401 a poll command. For NFC type-A, the reader device 404 may send 401 a SENS_REQ poll command. For NFC type-B, the reader device 404 may send 401 a SENSB_REQ poll command. For NFC type-F, the reader device 404 may send 401 a SENSF_REQ poll command.

Upon receiving the poll command, the wireless communication device 402 may send 403 a poll response. For NFC type-A, the wireless communication device 402 may send 403 a SENS_RES poll response. For NFC type-B, the wireless communication device 402 may send 403 a SENSB_RES poll response. For NFC type-F, the wireless communication device 402 may send 403 a SENSF_RES poll response.

Upon receiving a valid poll response, the reader device 404 may send 405 a non-standardized message 126. For example, the reader device 404 may send 405 a non-standardized message 126 using the same NFC technology identified by the poll response. The non-standardized message 126 may be a non-standardized packet that includes geographic location information 108 for the reader device 404. The non-standardized message 126 is described in more detail in connection with FIG. 5.

The wireless communication device 402 may send 407 a non-standardized response 128 to the reader device 404 indicating support for tuning based on the non-standardized message 126. The wireless communication device 402 may then tune 409 its NFC antenna 120a according to the geographic location information 108 included in the non-standardized message 126. This may be accomplished as described in connection with FIG. 1.

The reader device 404 may turn off 411 the magnetic field for a period of time (e.g., reset period 124) sufficient to allow the wireless communication device 402 to tune 409 its NFC antenna 120a according to the geographic location information 108 included in the non-standardized message 126. After the reset period 124, the reader device 404 may turn on 413 the magnetic field.

Upon turning on the magnetic field, the reader device 404 may send 415 a second poll command to the wireless communication device 402. The wireless communication device 402 may send 417 a poll response to the reader device 404. It should be noted that the wireless communication device 102 may now respond to the second poll command using the adjusted NFC antenna 120a tuning. Upon receiving the poll response, the reader device 404 and the wireless communication device 402 may establish 419 an NFC link to perform an NFC transaction.

FIG. 5 is a block diagram illustrating examples of a non-standardized message 526 and a non-standardized response 528 for geographic location-based tuning. The non-standardized message 526 may be sent by a reader device 104 (e.g., initiator device) as described above in connection with FIG. 1. The non-standardized message 526 may be a non-standardized packet (e.g., proprietary packet) that includes bytes reserved for NFC communication enhancement via geographic location-based information.

In this example, the non-standardized message 526 is 6 bytes. The non-standardized message 526 may include a command code byte (e.g., byte 0) that identifies the packet as a non-standardized packet from the reader device 104. One or more bytes may include the geographic location information 108. In this example, bytes 1-4 include the geographic location information 108. Additionally, one or more bytes may be used for cyclic redundancy check (CRC) information for the identified NFC technology. In this example, bytes 5-6 are used for CRC according to NFC type-A, B or F.

The non-standardized response 528 may be sent by a wireless communication device 102 (e.g., target device) as described above in connection with FIG. 1. The non-standardized response 528 may be a non-standardized packet (e.g., proprietary packet) that includes bytes reserved for NFC communication enhancement via geographic location information 108.

In this example, the non-standardized response 528 is 6 bytes. The non-standardized response 528 may include a command code byte (e.g., byte 0) that identifies the packet as a non-standardized packet from the wireless communication device 102. One or more bytes may include an acknowledgment (ACK) response. The ACK response may have a pre-determined format. In this example, bytes 1-4 include the ACK response. Additionally, one or more bytes may be used for cyclic redundancy check (CRC) information for the identified NFC technology. In this example, bytes 5-6 are used for CRC according to NFC type-A, B or F.

Figure 6:
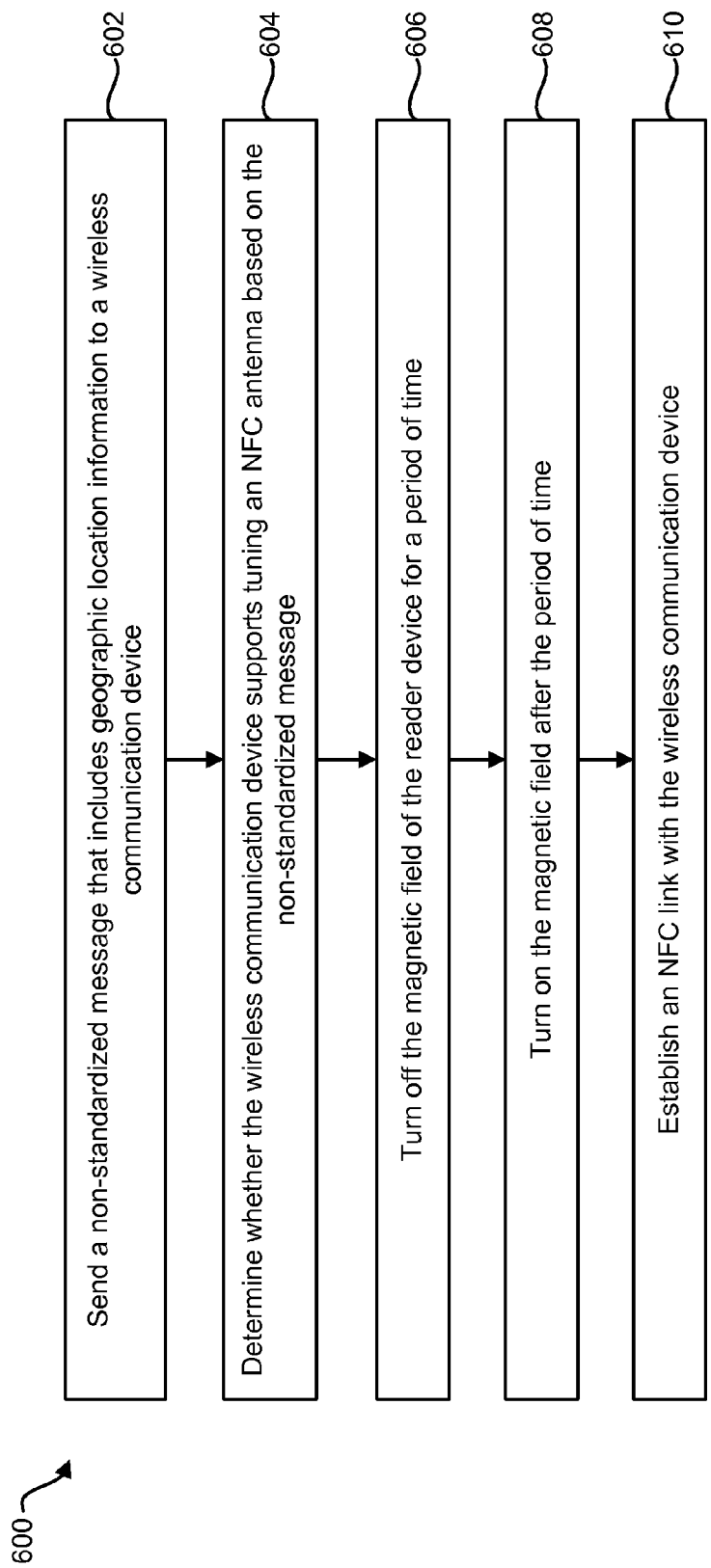
FIG. 6 is a flow diagram illustrating a method for tuning of an NFC antenna based on geographic location information included in a non-standardized message.

FIG. 6 is a flow diagram illustrating a method 600 for tuning of a near-field communication (NFC) antenna 120a based on geographic location information 108 included in a non-standardized message 126. The method 600 may be performed by a reader device 104. The reader device 104 may be configured with NFC circuitry.

The reader device 104 may send 602 a non-standardized message 126 that includes geographic location information 108 to a wireless communication device 102. For example, when the wireless communication device 102 enters the magnetic field of the reader device 104, the reader device 104 may initiate an NFC polling procedure. In response to receiving the poll command from the reader device 104, the wireless communication device 102 may send a poll response. Upon receiving the poll response, the reader device 104 may send 602 the non-standardized message 126 that includes geographic location information 108. The non-standardized message 126 may be formatted as described in connection with FIG. 5.

In one implementation, the non-standardized message 126 may include location coordinates of the reader device 104. In another implementation, the non-standardized message 126 may include a unique signature associated with the reader device 104 from which geographic location information 108 may be determined.

The reader device 104 may determine 604 whether the wireless communication device 102 supports tuning an antenna 120a for NFC based on the non-standardized message 126. If the wireless communication device 102 supports the non-standardized message 126 tuning, then the reader device 104 may receive a valid non-standardized response 128 from the wireless communication device 102. However, if the wireless communication device 102 does not support the non-standardized data exchange, the reader device 104 may timeout waiting for a non-standardized response 128.

The reader device 104 may turn off 606 the magnetic field for a period of time. The reader device 104 may turn off its magnetic field and turn it back on to reset the wireless communication device 102 for communication using an adjusted tuning. The reader device 104 may turn off 606 the magnetic field for a reset period 124. The reset period 124 may be an amount of time sufficient to allow the wireless communication device 102 to tune its NFC antenna 120a according to the geographic location information 108 included in the non-standardized message 126. After the period of time, the reader device 104 may turn on 608 the magnetic field.

The reader device 104 may establish 610 an NFC link with the wireless communication device 102. For example, if the wireless communication device 102 supports the non-standardized message 126 tuning, then the reader device 104 may establish 610 an NFC link with the wireless communication device 102 upon receiving a valid non-standardized response 128. Alternatively, if the wireless communication device 102 does not support the non-standardized data exchange, then the reader device 104 may establish 610 an NFC link after a timeout.

Figure 7:
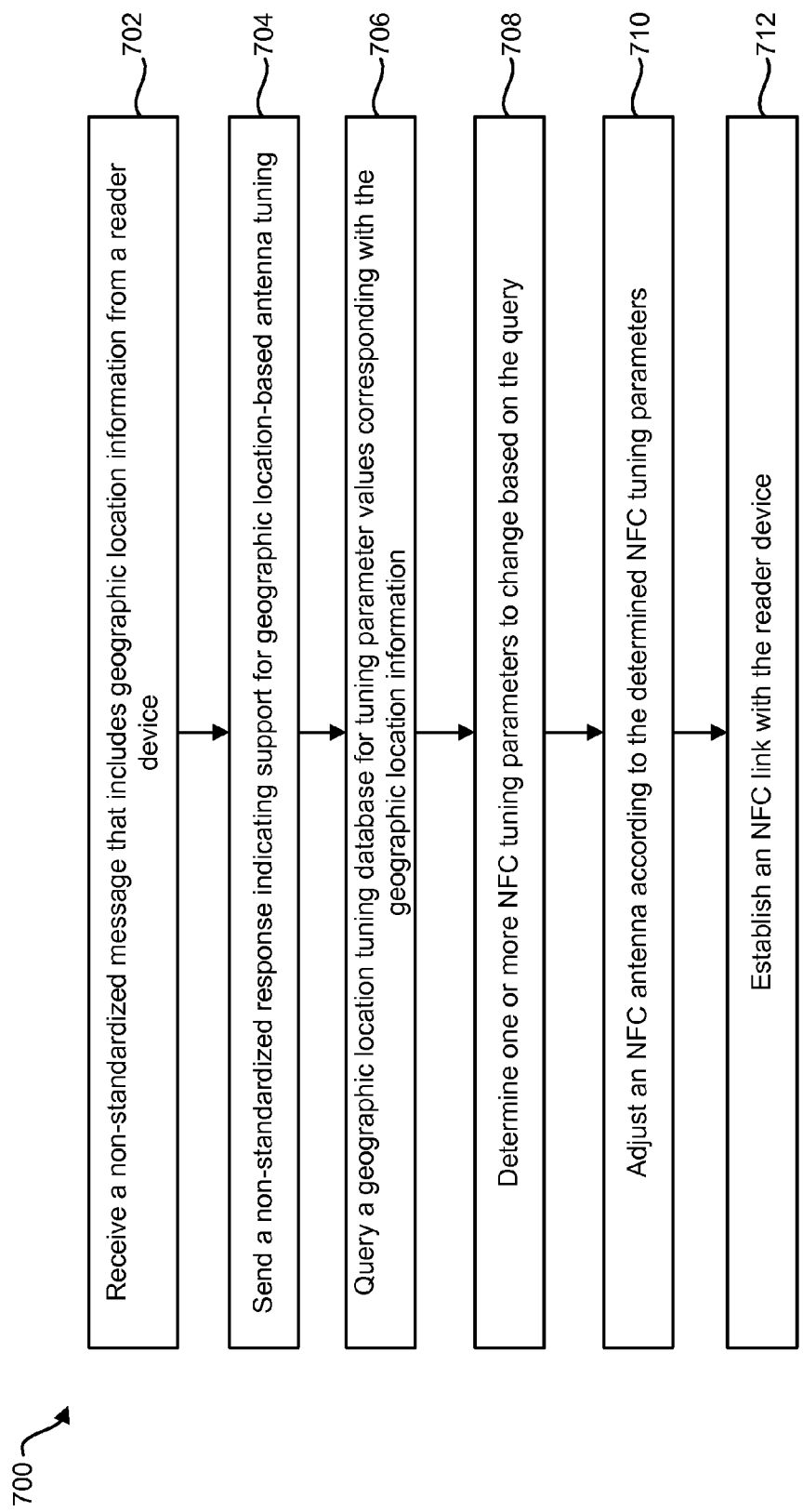
FIG. 7 is a flow diagram illustrating another method for tuning of an NFC antenna based on geographic location information included in a non-standardized message.

FIG. 7 is a flow diagram illustrating another method 700 for tuning of an NFC antenna 120a based on geographic location information 108 included in a non-standardized message 126. The method 700 may be performed by a wireless communication device 102. The wireless communication device 102 may be configured with NFC circuitry. The NFC circuitry may include an NFC controller and NFC antenna circuitry (e.g., an NFC antenna 120a and a matching network 118).

The wireless communication device 102 may receive 702 a non-standardized message 126 that includes geographic location information 108 from a reader device 104. For example, when the wireless communication device 102 enters the magnetic field of the reader device 104, the reader device 104 may initiate an NFC polling procedure. In response to receiving the poll command from the reader device 104, the wireless communication device 102 may send a poll response. Upon receiving the poll response, the reader device 104 may send the non-standardized message 126 that includes geographic location information 108.

The reader device 104 may send 704 a non-standardized response 128 indicating support for geographic location-based antenna tuning. The non-standardized response 128 may be formatted as described in connection with FIG. 5.

The wireless communication device 102 may query 706 a geographic location tuning database 114 for tuning parameter values corresponding with the geographic location information 108. The geographic location tuning database 114 may provide values for the NFC tuning parameters 116 that may be applied in a particular region.

The wireless communication device 102 may determine 708 one or more tuning parameters 116 to change based on the geographic location tuning database 114 query. For example, the geographic location tuning database 114 may output one or more NFC tuning parameters 116 that may be changed based on the input geographic location information 108.

The wireless communication device 102 may adjust 710 the NFC antenna 120a according to the determined NFC tuning parameters 116. NFC antenna 120a tuning can be performed by changing the resonance of the matching network 118. This may be accomplished by adjusting one or more components of the matching network 118.

The wireless communication device 102 may establish 712 an NFC link with the reader device 104 using the adjusted antenna tuning. For example, the wireless communication device 102 may perform a second polling operation with the reader device 104 using the adjusted antenna tuning. The wireless communication device 102 and the reader device 104 may then establish 712 an NFC link to perform an NFC transaction.

Figure 8:
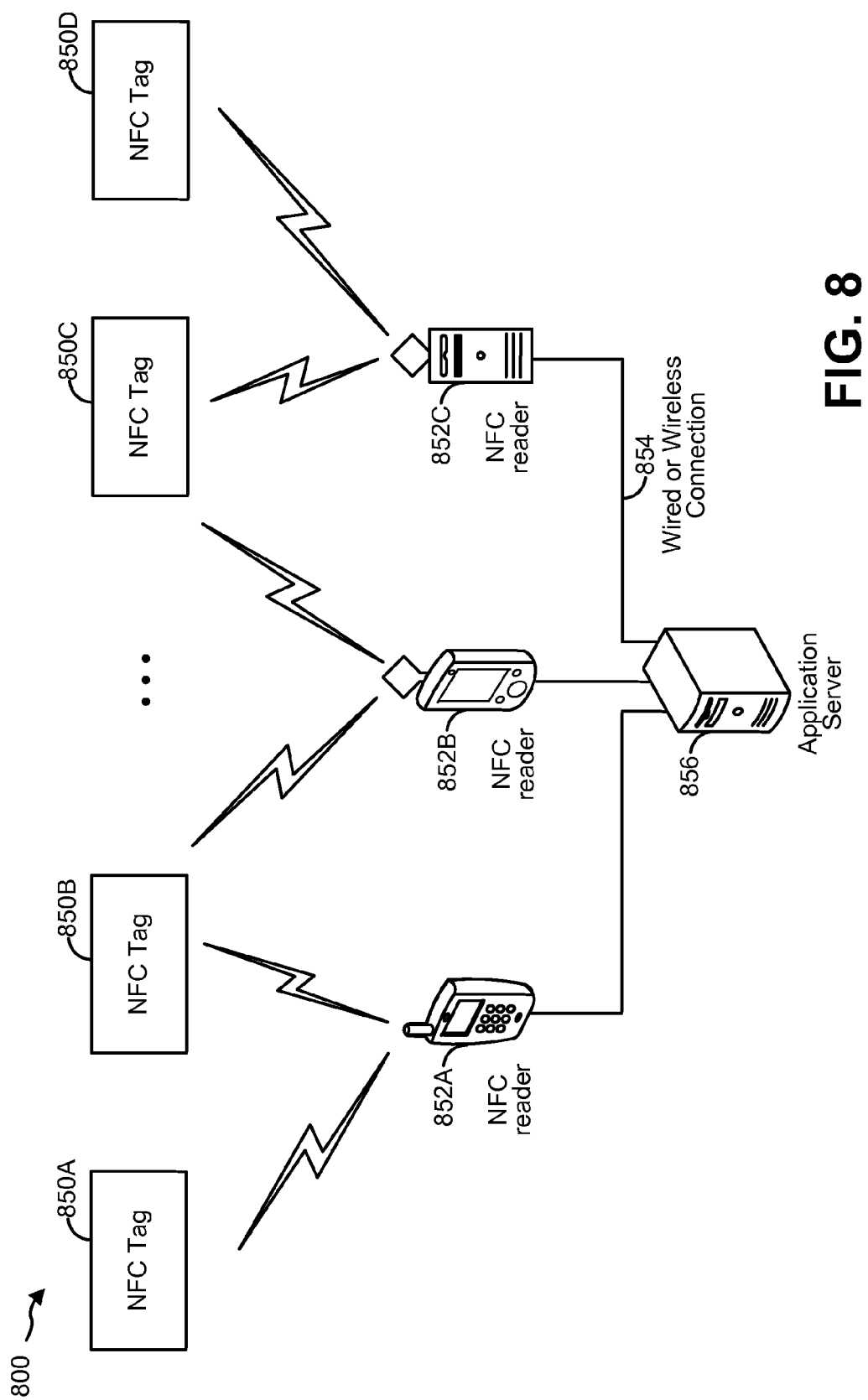
FIG. 8 is a block diagram illustrating an NFC system.

FIG. 8 is a block diagram illustrating an NFC system 800. The NFC system 800 includes a plurality of NFC tags 850A-850D, a plurality of NFC readers 852A-852C and an application server 856.

The NFC tags 850A-850D may each be associated with a particular object for a variety of purposes including, but not limited to, tracking inventory, tracking status, location determination and assembly progress. The NFC tags 850A-850D may be active devices that include internal power sources or passive devices that derive power from the NFC readers 852A-852C.

Although FIG. 8 shows only four NFC tags 850A-850D and three NFC readers 852A-852C, the present disclosure is not limited thereto. In one configuration, the NFC tags 850A-850D may be implemented in accordance with the wireless communication device 102 described in connection with FIG. 1. In one configuration, the readers 852A-852C may be implemented in accordance with the reader device 104 described in connection with FIG. 1.

Each NFC reader 852A-852C wirelessly communicates data with one or more NFC tags 850A-850D within its coverage area. For example, the NFC tags 850A and 850B may be within a coverage area of the NFC reader 852A, the NFC tags 850B and 850C may be within a coverage area of the NFC reader 852B, and the NFC tags 850C and 850D may be within a coverage area of the NFC reader 852C. In one configuration, the RF communication mechanism between the NFC readers 852A-852C and the NFC tags 850A-850D is a backscatter technique. In this configuration, the NFC readers 852A-852C request data from the NFC tags 850A-850D via an RF signal, and the RF tags 850A-850D respond with the requested data by modulating and backscattering the RF signal provided by the NFC readers 852A-852C.

In a configuration for near-field communication, the RF communication mechanism is an inductance technique whereby the NFC readers 852A-852C magnetically couple to the NFC tags 850A-850D via an RF signal to access the data on the NFC tags 850A-850D. In any of this configuration, the NFC tags 850A-850D provide the requested data to the NFC readers 852A-852C on the same RF carrier frequency as the RF signal.

In this manner, the NFC readers 852A-852C collect data from each of the NFC tags 850A-850D within its coverage area. The collected data is then conveyed to the application server 856 via a wired or wireless connection 854 and/or via a possible communication mechanism, for example, a peer-to-peer communication connection. In addition, and/or in the alternative, the application server 856 may provide data to one or more of the NFC tags 850A-850D via the associated NFC readers 852A-852C. Such downloaded information is application dependent and may vary greatly. Upon receiving the downloaded data, the NFC tag can store the data in a non-volatile memory therein.

In another configuration, the NFC readers 852A-852C may optionally communicate data on a peer-to-peer basis such that each NFC reader 852A-852C does not need a separate wired or wireless connection 854 to the application server 856. For example, the NFC reader 852A and the NFC reader 852B may communicate on a peer-to-peer basis utilizing a back scatter technique, a WLAN technique, and/or any other wireless communication technique. In this instance, the NFC reader 852B may not include a wired or wireless connection 854 to the application server 856. In configurations in which communications between the NFC reader 852A-852C and the application server 856 are conveyed through the wired or wireless connection 854, the wired or wireless connection 854 may utilize any one of a plurality of wired standards (e.g., Ethernet and fire wire) and/or wireless communication standards (e.g., IEEE 802.11x and Bluetooth).

As one of ordinary skill in the art will appreciate, the NFC system of FIG. 8 may be expanded to include a multitude of NFC readers 852A-852C distributed throughout a desired location (for example, a building or office site) where the NFC tags 850A-850D may be associated with equipment, inventory and/or personnel. In addition, it should be noted that the application server 856 may be coupled to another server and/or network connection to provide wide area network coverage.

Figure 9:
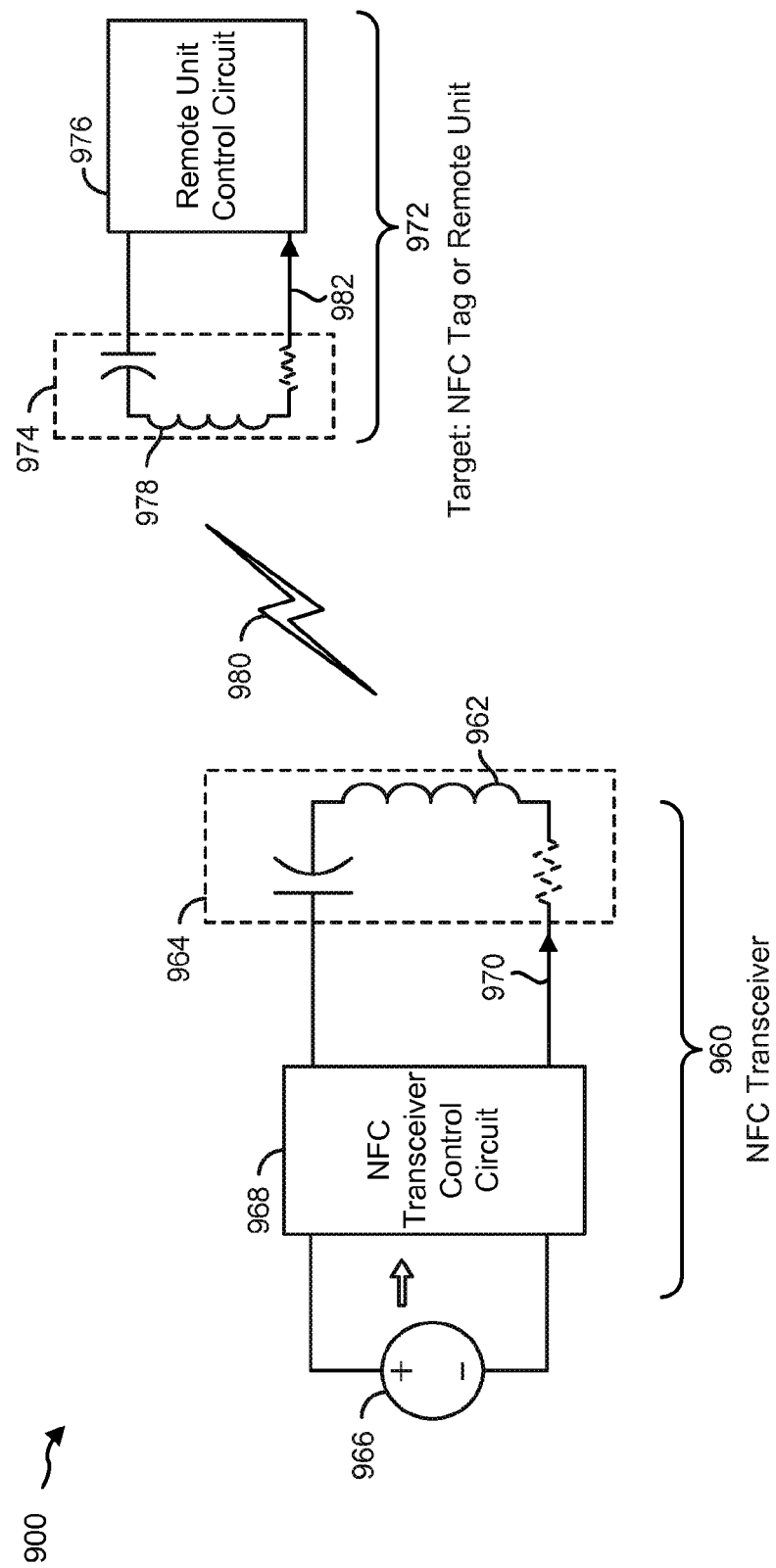
FIG. 9 is a block diagram illustrating an exemplary schematic of an NFC system including a transceiver and a remote unit.

FIG. 9 is a block diagram illustrating an exemplary schematic of an NFC system 900 including a transceiver and a remote unit. The NFC system 900 includes an NFC transceiver 960 and a remote unit 972 such as an NFC tag. The NFC transceiver 960 may include a voltage power source 966, an NFC transceiver control circuit 968 and a transmitter circuit 964. The NFC transceiver control circuit 968 is powered by the voltage source 966, and connected to one or more transceiver loops 962.

The transceiver loops 962 are hereinafter interchangeably used with coils or loop antennae. The coils and loop antenna may be made of conductive material, for example, an electromagnetic coil, through which an alternating current (AC) 970 can flow. The transceiver loops 962 may be circular, oval, and the like, although other sizes and shapes are possible.

For near-field communication, the AC current 970 flowing through the transceiver loops 962 can result in transmitting magnetic energy or magnetic flux 980 at various frequencies (e.g., about 100 kHz to about 40 MHz). In a near-field case, the wavelength of the emitted frequencies may be much longer than the size of loops 962 on the NFC transceiver 960.

The remote unit 972 includes a receiver circuit 974 and a remote unit control circuit 976. If the remote unit 972 is close enough to the NFC transceiver 960, the magnetic flux 980 from the transceiver 960 can get AC coupled onto one or more remote unit loops 978 of conductive material, which can be an unpowered device (i.e., without a battery or other means of applying continuous power) having the electromagnetic coil and remote unit control circuit 976.

An oscillating AC current 982 flowing in alternating directions in the remote unit control circuit 976 can be rectified by a rectifying diode in the remote unit control circuit 976, which can cause a voltage to be built up across a bypass capacitor in the remote unit control circuit 976. Once the bypass capacitor has built up a sufficient voltage, the remote unit control circuit 976 can become powered up and operational. By receiving coupled and modulated AC signals from the NFC transceiver 960, the remote unit 972 can receive and detect information (e.g., commands) from the NFC transceiver 960.

Once operational, the remote unit control circuit 976 may also send signals back to the NFC transceiver 960 by changing the impedance seen by the remote unit loops 978. This can be accomplished by shunting or opening the remote unit loops 978 with, for example, a switch. If the remote unit 972 is close enough to the NFC transceiver 960, the modulated electromagnetic field generated by the remote unit loops 978 in the remote unit 972 can be coupled back onto the transceiver loops 962 of the NFC transceiver 960. The signals sent back to the NFC transceiver 960 can be slow and on the order of 100 bits of data, and provide information back to the transceiver 960 such as the serial number or model number of the device to which the remote unit 972 is attached, credit card number, personal identification information, security codes and passwords, and the like.

Figure 10:
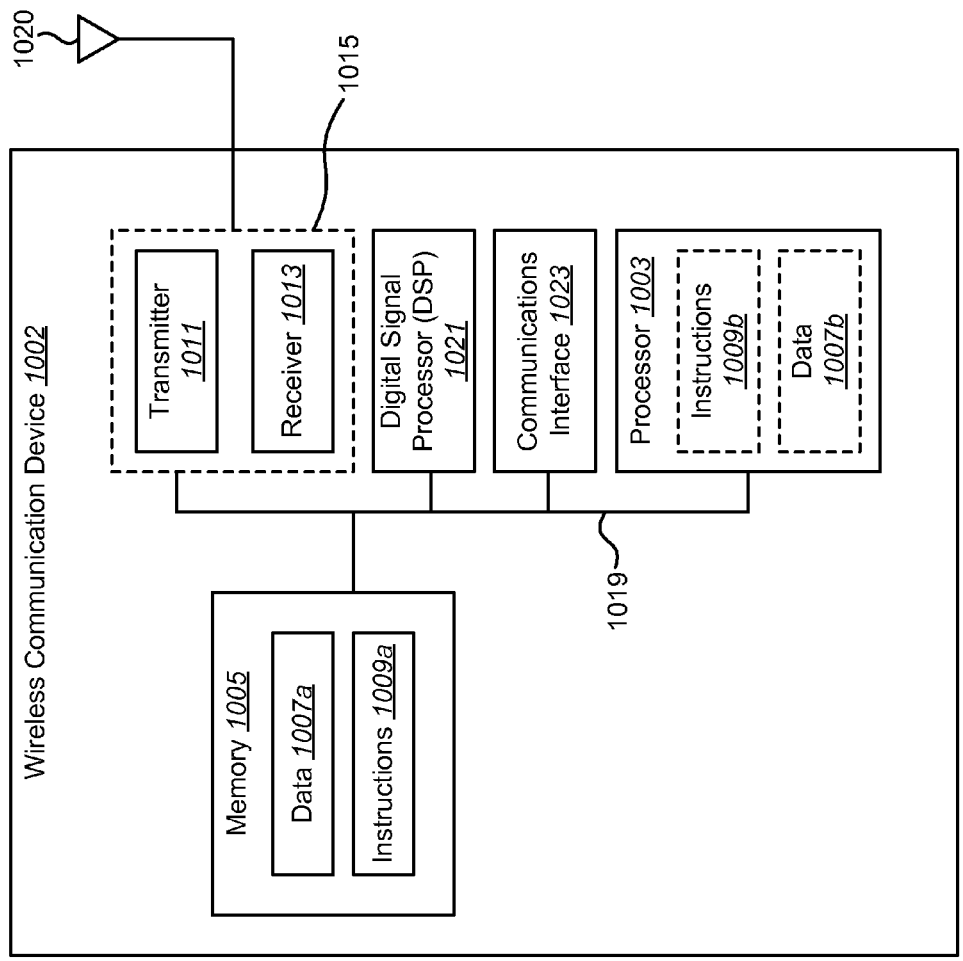
FIG. 10 illustrates certain components that may be included within a wireless communication device.

FIG. 10 illustrates certain components that may be included within a wireless communication device 1002. The wireless communication device 1002 may be a wireless device, an access terminal, a mobile station, a user equipment (UE), a laptop computer, a desktop computer, etc. For example, the wireless communication device 1002 of FIG. 10 may be implemented in accordance with the wireless communication device 102 of FIG. 1.

The wireless communication device 1002 includes a processor 1003. The processor 1003 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1002 of FIG. 10, in an alternative configuration, a combination of processors (e.g., an ARM and DSP) could be used.

The wireless communication device 1002 also includes memory 1005 in electronic communication with the processor 1003 (i.e., the processor can read information from and/or write information to the memory). The memory 1005 may be any electronic component capable of storing electronic information. The memory 1005 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007a and instructions 1009a may be stored in the memory 1005. The instructions 1009a may include one or more programs, routines, sub-routines, functions, procedures, code, etc. The instructions 1009a may include a single computer-readable statement or many computer-readable statements. The instructions 1009a may be executable by the processor 1003 to implement the methods disclosed herein. Executing the instructions 1009a may involve the use of the data 1007a that is stored in the memory 1005. When the processor 1003 executes the instructions 1009a, various portions of the instructions 1009b may be loaded onto the processor 1003, and various pieces of data 1007b may be loaded onto the processor 1003.

The wireless communication device 1002 may also include a transmitter 1011 and a receiver 1013 to allow transmission and reception of signals to and from the wireless communication device 1002 via an antenna 1020. The transmitter 1011 and receiver 1013 may be collectively referred to as a transceiver 1015. The wireless communication device 1002 may also include (not shown) multiple transmitters, multiple antennas, multiple receivers and/or multiple transceivers.

The wireless communication device 1002 may include a digital signal processor (DSP) 1021. The wireless communication device 1002 may also include a communications interface 1023. The communications interface 1023 may allow a user to interact with the wireless communication device 1002.

The various components of the wireless communication device 1002 may be coupled together by one or more buses, which may include a power bus, a control signal bus, a status signal bus, a data bus, etc. For the sake of clarity, the various buses are illustrated in FIG. 10 as a bus system 1019.

Figure 11:
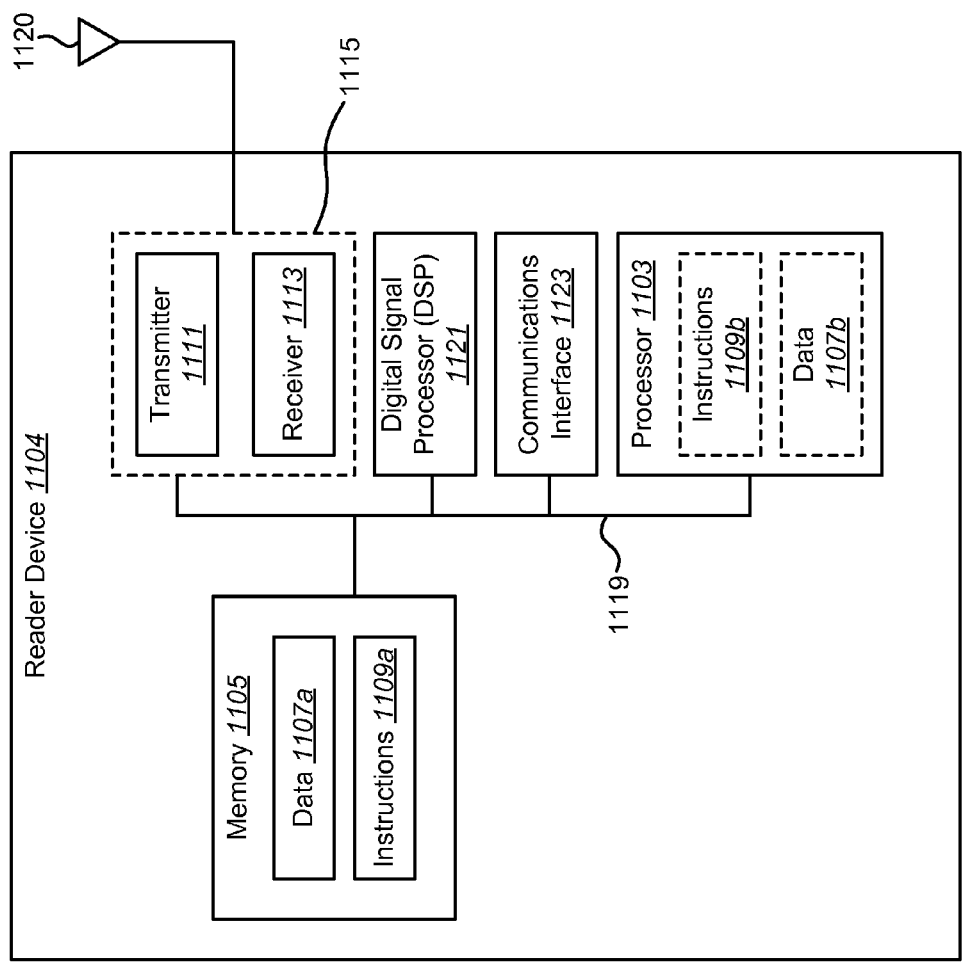
FIG. 11 illustrates certain components that may be included within a reader device.

FIG. 11 illustrates certain components that may be included within a reader device 1104. The reader device 1104 may be a wireless device, an access terminal, a mobile station, a user equipment (UE), a laptop computer, a desktop computer, etc. For example, the reader device 1104 of FIG. 11 may be implemented in accordance with the reader device 104 of FIG. 1.

The reader device 1104 includes a processor 1103. The processor 1103 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1103 may be referred to as a central processing unit (CPU). Although just a single processor 1103 is shown in the reader device 1104 of FIG. 11, in an alternative configuration, a combination of processors (e.g., an ARM and DSP) could be used.

The reader device 1104 also includes memory 1105 in electronic communication with the processor 1103 (i.e., the processor can read information from and/or write information to the memory). The memory 1105 may be any electronic component capable of storing electronic information. The memory 1105 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1107a and instructions 1109a may be stored in the memory 1105. The instructions 1109a may include one or more programs, routines, sub-routines, functions, procedures, code, etc. The instructions 1109a may include a single computer-readable statement or many computer-readable statements. The instructions 1109a may be executable by the processor 1103 to implement the methods disclosed herein. Executing the instructions 1109a may involve the use of the data 1107a that is stored in the memory 1105. When the processor 1103 executes the instructions 1109a, various portions of the instructions 1109b may be loaded onto the processor 1103, and various pieces of data 1107b may be loaded onto the processor 1103.

The reader device 1104 may also include a transmitter 1111 and a receiver 1113 to allow transmission and reception of signals to and from the reader device 1104 via an antenna 1120. The transmitter 1111 and receiver 1113 may be collectively referred to as a transceiver 1115. The reader device 1104 may also include (not shown) multiple transmitters, multiple antennas, multiple receivers and/or multiple transceivers.

The reader device 1104 may include a digital signal processor (DSP) 1121. The reader device 1104 may also include a communications interface 1123. The communications interface 1123 may allow a user to interact with the reader device 1104.

The various components of the reader device 1104 may be coupled together by one or more buses, which may include a power bus, a control signal bus, a status signal bus, a data bus, etc. For the sake of clarity, the various buses are illustrated in FIG. 11 as a bus system 1119.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, FIG. 3, FIG. 6 and FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication by a wireless communication device, comprising,
    receiving geographic location information;
    sending a message to a reader device indicating support for tuning an antenna for inductively coupled communication based on the geographic location information;
    querying a geographic location tuning database for near-field communication (NFC) tuning parameter values corresponding with the geographic location information;
    determining one or more NFC tuning parameters to change based on the NFC tuning parameter values; and
    adjusting an antenna for inductively coupled communication according to the determined NFC tuning parameters.

2. The method of claim 1, wherein the geographic location information is received in at least one of a Global Positioning System (GPS) signal, a wireless wide area network (WWAN) signal, or a wireless local area network (WLAN) signal.

3. The method of claim 1, wherein the geographic location information is received in a non-standardized message sent by the reader device.

4. The method of claim 3, wherein the non-standardized message includes geographic location coordinates of the reader device.

5. The method of claim 3, wherein the non-standardized message includes a unique signature associated with the reader device from which the geographic location information of the reader device is determined.

6. The method of claim 3, wherein the non-standardized message is received in response to sending a poll response to the reader device, wherein the non-standardized message is sent using NFC technology identified by the poll response.

7. The method of claim 6, wherein the non-standardized message comprises a packet that includes a command code byte that identifies the packet as a non-standardized packet from the reader device, one or more bytes that include the geographic location information, and one or more bytes with cyclic redundancy check information for the identified NFC technology.

8. The method of claim 3, wherein the message comprises a non-standardized response to the non-standardized message sent by the reader device.

9. The method of claim 8, wherein the non-standardized response comprises a packet that includes a command code byte that identifies the packet as a non-standardized packet from the wireless communication device, one or more bytes that include an acknowledgment (ACK) response, and one or more bytes with cyclic redundancy check information for the identified NFC technology.

10. The method of claim 1, wherein the geographic location information is received via a combination of a GPS signal and a non-standardized message, wherein the GPS signal is used by default to obtain the geographic location information, and the non-standardized message is used to obtain the geographic location information if the GPS signal is not available.

11. The method of claim 1, wherein querying the geographic location tuning database comprises receiving at least one of a target receive (RX) frequency, a target transmit (TX) frequency, an initiator RX frequency, an initiator TX frequency and/or load modulation ON/OFF impedance for a region indicated by the geographic location information.

12. A wireless communication device, comprising:
a processor;
a memory in communication with the processor; and
instructions stored in the memory, the instructions executable by the processor to:
receive geographic location information;
send a message to a reader device indicating support for tuning an antenna for inductively coupled communication based on the geographic location information;
query a geographic location tuning database for near-field communication (NFC) tuning parameter values corresponding with the geographic location information;
determine one or more NFC tuning parameters to change based on the NFC tuning parameter values; and
adjust an antenna for inductively coupled communication according to the determined NFC tuning parameters.

13. The wireless communication device of claim 12, wherein the geographic location information is received in at least one of a Global Positioning System (GPS) signal, a wireless wide area network (WWAN) signal, or a wireless local area network (WLAN) signal.

14. The wireless communication device of claim 12, wherein the geographic location information is received in a non-standardized message sent by the reader device.

15. The wireless communication device of claim 14, wherein the non-standardized message includes geographic location coordinates of the reader device.

16. The wireless communication device of claim 14, wherein the non-standardized message includes a unique signature associated with the reader device from which the geographic location information of the reader device is determined.

17. The wireless communication device of claim 14, wherein the non-standardized message is received in response to sending a poll response to the reader device, wherein the non-standardized message is sent using NFC technology identified by the poll response.

18. The wireless communication device of claim 17, wherein the non-standardized message comprises a packet that includes a command code byte that identifies the packet as a non-standardized packet from the reader device, one or more bytes that include the geographic location information, and one or more bytes with cyclic redundancy check information for the identified NFC technology.

19. The wireless communication device of claim 14, wherein the instructions executable to send the message comprise instructions executable to send a non-standardized response to the non-standardized message sent by the reader device.

20. The wireless communication device of claim 19, wherein the non-standardized response comprises a packet that includes a command code byte that identifies the packet as a non-standardized packet from the wireless communication device, one or more bytes that include an acknowledgment (ACK) response, and one or more bytes with cyclic redundancy check information for the identified NFC technology.

21. The wireless communication device of claim 12, wherein the geographic location information is received via a combination of a GPS signal and a non-standardized message, wherein the GPS signal is used by default to obtain the geographic location information, and the non-standardized message is used to obtain the geographic location information if the GPS signal is not available.

22. A method for wireless communication by a reader device, comprising, sending a non-standardized message that includes geographic location information to a wireless communication device; receiving a message from the wireless communication device indicating support for tuning an antenna for inductively coupled communication using near-field communication (NFC) tuning parameter values corresponding to the geographic location information based on the non-standardized message; turning off a magnetic field of the reader device for a period of time sufficient to allow the wireless communication device to tune its antenna according to the geographic location information included in the non-standardized message; and turning on the magnetic field after the period of time to perform an NFC transaction with the wireless communication device.

23. The method of claim 22, wherein the non-standardized message includes geographic location coordinates of the reader device.

24. The method of claim 22, wherein the non-standardized message includes a unique signature associated with the reader device from which the geographic location information of the reader device is determined.

25. The method of claim 22, wherein the non-standardized message is sent in response to receiving a poll response from the wireless communication device, wherein the non-standardized message is sent using an NFC technology identified by the poll response.

26. A reader device, comprising: a processor; a memory in communication with the processor; and instructions stored in the memory, the instructions executable by the processor to: send a non-standardized message that includes geographic location information to a wireless communication device; receive a message from the wireless communication device indicating support for tuning an antenna for inductively coupled communication using near-field communication (NFC) tuning parameter values corresponding to the geographic location information based on the non-standardized message; turn off a magnetic field of the reader device for a period of time sufficient to allow the wireless communication device to tune its antenna according to the geographic location information included in the non-standardized message; and turn on the magnetic field after the period of time to perform an NFC transaction with the wireless communication device.

27. The reader device of claim 26, wherein the non-standardized message includes geographic location coordinates of the reader device.

28. The reader device of claim 26, wherein the non-standardized message includes a unique signature associated with the reader device from which the geographic location information of the reader device is determined.

29. The reader device of claim 26, wherein the non-standardized message is sent in response to receiving a poll response from the wireless communication device, wherein the non-standardized message is sent using an NFC technology identified by the poll response.

* * * * *